United States Patent [19]

Deets et al.

[11] Patent Number: 4,744,864

[45] Date of Patent: May 17, 1988

[54] CATIONIC GRAFTED STARCH COPOLYMERS AS HIGH-STRENGTH PAPER ADDITIVES

[75] Inventors: Gary L. Deets, St. Peters; William G. Tamalis, Maryland Heights, both of Mo.

[73] Assignee: Akzo N.V., Arnhem, Netherlands

[21] Appl. No.: 57,411

[22] Filed: Jun. 2, 1987

Related U.S. Application Data

[62] Division of Ser. No. 710,191, Mar. 11, 1985, Pat. No. 4,684,708.

[51] Int. Cl.$^4$ ............................ D21D 3/02; D21D 3/40
[52] U.S. Cl. .............................. 162/164.6; 162/168.2
[58] Field of Search ............................ 162/164.6, 168.2

[56] References Cited

U.S. PATENT DOCUMENTS

| | | | |
|---|---|---|---|
| 4,152,201 | 5/1979 | Killam | 162/168.2 |
| 4,489,192 | 12/1984 | Shih et al. | 162/164.6 |
| 4,557,801 | 12/1985 | Avis | 162/164.6 |
| 4,604,163 | 8/1986 | Van Eenam | 162/168.2 |
| 4,643,801 | 2/1987 | Johnson | 162/164.6 |

FOREIGN PATENT DOCUMENTS

| | | | |
|---|---|---|---|
| 2822321 | 12/1978 | Fed. Rep. of Germany | 162/164.6 |
| 0090699 | 7/1980 | Japan | 162/164.6 |

*Primary Examiner*—Delbert R. Phillips
*Assistant Examiner*—Nathan M. Nutter
*Attorney, Agent, or Firm*—David H. Vickrey; Francis W. Young; Louis A. Morris

[57] ABSTRACT

Cationic starch graft copolymers are disclosed which improve the dry strength of paper when used as wet-end additives. Such copolymers comprise cationic starch, nonionic vinyl monomers and cationic vinyl monomers which have been polymerized.

13 Claims, No Drawings

CATIONIC GRAFTED STARCH COPOLYMERS AS HIGH-STRENGTH PAPER ADDITIVES

This is a division of application Ser. No. 710,191 filed Mar. 11, 1985 and now U.S. Pat. No. 4,684,708.

BACKGROUND OF THE INVENTION

The present invention relates to the field of dry strength additives for paper products. More specifically, the present invention is a water-soluble graft copolymer of cationic starch, nonionic vinyl monomers, and cationic monomers.

Water-soluble polyacrylamides are used at present to provide dry strength to paper. They are added to pulp as wet-end additives, and are relatively effective in increasing the dry tensile strength of the resulting paper. However, polyacrylamides are derived from petroleum products, and their cost therefore is linked to the fluctuating price of crude oil. In addition, petroleum is a nonrenewable natural resource, the supply of which is finite. Therefore, there is a continuing need in the paper making field for a cheaper stably priced alternative to polyacrylamide, which is water soluble, which can perform more efficiently, and which can be made from annually renewable natural sources.

SUMMARY OF THE PRESENT INVENTION

It is an object of the present invention to provide a cationic grafted starch copolymer which is useful as a dry strength additive for paper.

It is yet another object of the present invention to provide a method for making the dry strength additive for paper.

Still another object of the present invention is to provide a paper having improved dry strength.

In accordance with the above objects, the invention provides a water soluble cationic grafted starch copolymer useful as a dry strength additive in paper making, said copolymer comprising starch, nonionic vinyl monomer and a cationic vinyl monomer wherein:

(a) said starch is present in amounts of from about 10% to about 90% of the polymer, and at least about 5% of the starch is cationic starch;

(b) said nonionic vinyl monomer is present in amounts of from about 90% to about 10% of the polymer; and (c) said cationic vinyl monomer is present in amounts from about 5% to about 80% of the polymer.

The present invention also provides a method for making the cationic grafted starch copolymer. In addition, this invention contemplates a paper made with the cationic grafted starch copolymer of this invention.

The dry strength additive of this invention provides tensile strength to paper that is equivalent to, and in many cases substantially higher than, polyacrylamide, which is conventionally used in the art. In addition, the dry strength additive of this invention contains between 10 and 90% starch, a renewable natural resource derived from crop plants, whereas polyacrylamide, the conventional dry strength additive, is derived from petroleum, a nonrenewable natural resource.

DESCRIPTION OF THE PREFERRED EMBODIMENTS

The present invention is directed to a cationic grafted starch polymer which is useful as a dry strength agent for paper substrates. The cationic grafted starch contains a starch backbone to which nonionic vinyl monomer and cationic vinyl monomer segments, as defined below, are grafted. This cationic grafted starch copolymer is essentially water soluble and therefore suitable for use in the conventional wet-end treatment of paper pulp.

For the purposes of the present invention, the term "nonionic vinyl monomer" means a polymerizable vinyl monomer, that is, an organic compound containing a vinyl group which is available for free radical polymerization which does not impart an ionic charge to the grafted starch copolymer. Nonionic vinyl monomers include styrenes, acrylates, acrylamides, acrylonitriles, conjugated diene monomers, and the like. The type and amount of nonionic vinyl monomer must be controlled so that the final product has sufficient water solubility for use in paper making. A particularly suitable nonionic vinyl monomer for the present invention is acrylamide.

For the purposes of the present invention, "cationic vinyl monomer" means a polymerizable vinyl monomer which imparts a positive ionic charge to the grafted starch copolymer. This can be accomplished either by polymerization with a monomer that contains a positive charge or with a monomer that can be converted to contain a positive charge after polymerization. Particularly preferable are those monomers which contain a quaternary ammonium ion. Such quaternary ammonium-containing monomers include, without limitation, the dimethyl sulfate and methyl chloride quaternary salts of dimethylaminoethyl methacrylate, and the methyl chloride quaternary salt of dimethyl diallyl amine. Alternatively, other cationic vinyl monomers can be used, such as, N,N-dialkyl aminoalkyl acrylates and methacrylates and their salts, N,N-dialkyl aminoalkyl acrylamide and methacrylamide and their salts, and aryl vinylbenzyl dialkylamines and their salts can be used.

For the purposes of the present invention, "cationic starch" means starch which has a positive charge density of greater than about 0.1 meg/g at pH 4.0. There are a number of derivatizing agents used to impart a positive charge density to starch. This invention can utilize cationic starch regardless of its method of preparation. Some cationic starches have a positive charge in acidic environments, due to protonation of a substituent, such as protonation of an amino nitrogen, but lose this positive charge under neutral or basic conditions. Other cationic starches carry a formal charge over the entire pH range, such as those having quaternary ammonium, quaternary phosphonium, tertiary sulfonium, or other substituents. Either type of cationic starch can be used with this invention, provided the pH during use of the product is within the range in which the starch exhibits its positive charge. Because of enhanced flexibility in pH, it is preferred to use a cationic starch which retains a positive charge regardless of pH. Particularly preferred is a cationic charge that has been derivatized to contain a quaternary ammonium ion. Frequently, such quaternary ammonium-containing starch has been derivatized by etherification of hydroxyl groups with an appropriate etherifying agent having a cationic character such as the methyl chloride quaternary salt of N-(2,3-epoxypropyl)dimethylamine or N-(2,3-epoxypropyl) dibutylamine or N-(2,3-epoxypropyl)methylaniline.

"Nonionic starch" means starch having a charge density of less than about 0.1 meq/g at pH 4.0. Typically, the starch will be derivatized starch, for example hydroxyethylated starch, oxidized, hydroxyalkylated, carbooxyalkylated, or even degraded. The starches can be from any of a variety of sources such as corn, rice, sorghum, tapioca, wheat, potato and the like. The starch must contain hydroxyl or other linkages as grafting sites for the vinyl monomers. The starch may be degraded, enzyme-converted, or molecular weight lowered.

In a preferred embodiment of the present invention, 100% cationic starch is used with no nonionic starch. The nonionic starch performs poorly in comparison to the cationic starch in these formulations, in terms of tensile strength improvements of paper made with the formulations.

In another preferred embodiment of the present invention, the starch used is a cationic starch which contains methyl chloride quaternary salt of 3-dimethylamino-propan-2-ol ether substituents, which is sold with various charge densities and molecular weights by Pennick and Ford, under the tradename APOLLO, as the 400, 600, and 700 series.

The cationic grafted starch copolymer of the present invention readily may be prepared by reacting nonionic vinyl monomer, cationic vinyl monomer, and starch in an aqueous medium, in the presence of a water soluble free-radical catalyst. Although it is not intended to be bound by the following interpretation, it is believed that a free-radical is formed on the starch backbone, which thus polymerizes nonionic vinyl monomer and/or cationic vinyl monomer. At the time of the polymerization, the starch is in gelatinized form. Typically, these grafted starch polymers are prepared by heating the solution of starch, nonionic vinyl monomer and cationic vinyl monomers to 75°-95° C. until the starch is gelatinized, and then adding the free-radical catalyst. The reaction is then maintained a suitable temperature for polymerization, usually at about 90° C. Alternatively, the starch may be pregelatinized and the reaction mixture thereafter formed.

Useful free-radical catalysts include, but are not limited to, those which establish mild oxidizing conditions, such as hydrogen peroxides, hydroperoxides, potassium persulfate, ammonium persulfate, ceric ion, 2,2'-azo-bis (amidinopropane) hydrochloride.

Typically, the reaction is carried out until all the monomer is consumed.

The polymerization must be carried out in substantially neutral to acidic conditions. Running the reaction at a higher pH results ultimately in a diminished improvement in tensile strength of paper containing the reaction product. In a preferred embodiment of the present invention, the reaction is run at a pH of about 4.5 to about 5.

The final product mixture contains three major components: (1) unreacted starch, (2) random copolymers of nonionic and cationic vinyl monomers, and (3) graft copolymer of starch, nonionic vinyl monomer and cationic vinyl monomer. The graft copolymer is comprised of a cationic starch upon which copolymer segments of nonionic and cationic vinyl monomers are grafted.

The proportion of components in the copolymer can vary widely. For example, the starch can comprise from about 10% to about 90% of the copolymer. Preferably though, the starch comprises from about 20 to about 70% of the copolymer. In one particularly preferred embodiment, the starch comprises from about 25% to about 55% of the copolymer.

The nonionic vinyl monomer can comprise from about 10% to about 90% of the copolymer, preferably from about 35% to about 70%. The cationic vinyl monomer can comprise from about 5% to about 80% of the copolymer, preferably from about 5% to about 10%.

The product mixture can be used without purification as a wet-end additive in paper making. The mixture can, for example, be diluted before adding to the paper pulp. The general manufacturing process for paper, including the term "wet-end", is well-known to those skilled in the art and described generally in *Pulp & Paper Manufacture*, Vol. III, Papermaking and Paperboard Making, R. G. McDonald, editor: J. N. Franklin, Tech. Editor, McGraw Hill Book Co., 1970. Generally, the amount of the cationic grafted starch copolymer of the present invention used to prepare paper can be adjusted to achieve the desired increase in tensile strength, generally the amount used, on a solids weight basis, is between about 2 pounds per ton and 25 pounds per ton of paper pulp.

The following examples illustrate the cationic grafted starch copolymers in accordance with the present invention, and compare the performance of these copolymers in terms of improvement of tensile strength of paper made with them. These examples are included for illustrative purposes only and are not intended to limit the scope of the invention.

In examples 1–4, the performance of each dry strength resin was determined by comparing untreated paper (the "blank" value) to paper made with dry strength formulation. The comparison is expressed in terms of percent increase in tensile strength over the blank.

$$\% \text{ Increase} = \frac{TSTP - TSB}{TSB} \times 100$$

where TSTP is the tensile strength of the treated paper, corrected for basis weight of the paper, and TSB is the tensile strength of the blank, corrected for basis weight of the paper. The testing of the paper was done using an Instron tensile strength machine, a standard technique known in the art. The cross-direction dry tensile strength was measured, corrected for basis weight, and reported in pounds per lineal inch of paper.

These examples utilized modified corn starch obtained from Pennick and Ford Ltd., sold under the tradename APOLLO. The nonionic starch used had a charge density of about 0.04 meq/g, and is sold under the tradename PENFORD GUM 290. The cationic starches had been modified by addition of the methyl chloride quaternary salt of 3-dimethylamino-propan-2-ol ether substituents, with varying charge densities and varying degrees of molecular weight reduction by acidic hydrolysis. APOLLO 460 and 480 were both molecular weight reduced, although 480 has been hydrolyzed further than 460, and both had a charge density of about 0.10 meq/g. APOLLO 660 and 680 were both molecular weight reduced, although 680 had been hydrolyzed further than 660, and both had a charge density of about 0.16 meq/g. APOLLO 700 had a charge density of about 0.45 meq/g and had not been molecular weight reduced.

EXAMPLE 1

The effect of varying the ratio of cationic (APOLLO 460) to nonionic starch in blends used to produce cationic grafted starch copolymer was determined at different percentages of total starch. The grafted starch copolymers contained about 10% dimethyl sulfate quaternary salt of dimethylaminoethyl methacrylate, and the indicated percentage of total starch in the indicated ratio of cationic to nonionic starch, with the remainder being acrylamide. The resin was added at a rate of 5 lbs. per ton of paper pulp (0.25% by weight). The results are shown in Table 1. At all starch concentrations used, cationic starch outperformed nonionic starch. In addition, blends at all ratios showed lower tensile strength than purely cationic starch. Of the starch concentrations tested, best performance resulted when 30% starch was used in the copolymer formulation. Enzyme conversion of the cationic starch in the formulations decreased its efficacy by about one-half.

TABLE 1

| % Starch | % Cationic Starch/<br>% Nonionic Starch | % Increase in*<br>Tensile Strength |
|---|---|---|
| 70 | 25/75 | 8.9 |
|  | 50/50 | 8.5 |
|  | 75/25 | 7.6 |
|  | 100/0 | 12.8 |
| 50 | 0/100 | 0.0 |
|  | 5/95 | 8.2 |
|  | 10/90 | 8.2 |
|  | 25/75 | 8.9 |
|  | 50/50 | 5.7 |
|  | 75/25 | 8.9 |
|  | 100/0 | 15.4 |
| 50 | 100/0<br>(Enzyme-converted) | 7.6 |
| 30 | 0/100 | 0.0 |
|  | 25/75 | 8.9 |
|  | 50/50 | 8.9 |
|  | 75/25 | 8.9 |
|  | 100/0 | 20.5 |
| 15 | 100/0 | 12.7 |

*Increase is expressed in comparison to paper without any chemical additive.

EXAMPLE 2

The effect of various forms of cationic starch on the formulation's ability to increase tensile strength was evaluated. In each grafted starch copolymer, the cationic monomer was the dimethyl sulfate quaternary salt of dimethylaminoethyl methacrylate and comprised 10% of the grafted starch polymer, the indicated cationic starch comprised 30%, 50% or 70% as indicated, and acrylamide was the remainder.

TABLE 2

| APOLLO Starch | % Starch | lbs./Ton | % Increase |
|---|---|---|---|
| 460 | 30 | 5 | 20.5 |
|  |  | 10 | 21.8 |
|  | 50 | 5 | 15.4 |
|  |  | 10 | 23.1 |
|  | 70 | 5 | 12.8 |
|  |  | 10 | 15.4 |
| 480 | 30 | 5 | 14.1 |
|  |  | 10 | 20.5 |
|  | 50 | 5 | 15.4 |
|  |  | 10 | 19.2 |
|  | 70 | 5 | 11.5 |
|  |  | 10 | 10.3 |
| 660 | 30 | 5 | 0.0 |
|  |  | 10 | 7.0 |
|  | 50 | 5 | 5.6 |
|  |  | 10 | 9.9 |
|  | 70 | 5 | 0.0 |
|  |  | 10 | 2.8 |
| 680 | 30 | 5 | 10.0 |
|  |  | 10 | 14.3 |
|  | 50 | 5 | 7.1 |
|  |  | 10 | 17.1 |
|  | 70 | 5 | 2.9 |

TABLE 2-continued

| APOLLO Starch | % Starch | lbs./Ton | % Increase |
|---|---|---|---|
|  |  | 10 | 8.6 |
| 700 | 30 | 5 | 18.3 |
|  |  | 10 | 23.9 |

EXAMPLE 3

The adjustment of pH during the preparation of the graft copolymer is crucial in order to obtain the best tensile strength formulations. Graft copolymer was prepared at the indicated pH, using 70% of a 50/50 mixture of APOLLO 460 and nonionic starch, 10% dimethyl sulfate quaternary salt of dimethylaminoethyl methacrylate, and 20% acrylamide. The resulting grafted starch copolymer was used to make paper from 50/50 hardwood/softwood paper pulp, at a rate of 5 lbs. per ton of pulp. The results shown in Table 3 demonstrate the importance of proper pH.

TABLE 3

| pH | % Increase in<br>Tensile Strength |
|---|---|
| 9.0 | 0.0 |
| 7.0 | 3.5 |
| 5.0 | 8.5 |

EXAMPLE 4

The effect of three different cationic monomers on the tensile strength improvement of resulting formulations was evaluated. Cationic grafted starch polymer was prepared using 70% starch, which was about half APOLLO 460 cationic starch and about half nonionic starch; 20% acrylamide; and 10% of the indicated cationic vinyl monomer. Paper was made using the resulting formulation at the indicated level of use. As seen in Table 4, the methyl chloride quaternary salt of dimethylaminoethyl methacrylate contributed the greatest increase in tensile strength of the monomers tested.

TABLE 4

| Cationic Monomer | lbs./Ton | % Increase in<br>Tensile Strength |
|---|---|---|
| Methyl Chloride Quaternary<br>Salt of Dimethylaminoethyl<br>Methacrylate | 5<br>10 | 10.3<br>17.9 |
| Dimethyl Sulfate Quaternary<br>Salt of Dimethylaminoethyl<br>Methacrylate | 5<br>10 | 8.5<br>14.1 |
| Methyl Chloride Quaternary<br>Salt of Methyl Diallyl Ammonia | 5<br>10 | 9.3<br>16.0 |

EXAMPLE 5

At the present time, polyacrylamide is standardly used in the art to increase paper dry strength. Shown below in Table 5 are results comparing formulations of the present invention to polyacrylamide, as dry tensile strength additives. Formulations of the present invention function as well, or better than polyacrylamide. The polyacrylamide used for comparison was a cationically charged acrylamide copolymer sold by American Cyanamide under the tradename ACCOSTRENGTH 711. The cationic grafted starch copolymers were prepared using the indicated percentage of APOLLO 460, 480 and 680 starches as the cationic starch or with a 50:50 mixture of APOLLO 460 cationic starch and PENFORD GUM 290 nonionic starch. The cationic monomers were used at the indicated percentage, and were dimethylaminoethyl methacrylate methyl chloride quaternary salt, designated as monomer type 1; dimethylaminoethyl methacrylate dimethyl sulfate quaternary salt, designated as monomer type 2; and dimethyl diallyl ammonium chloride, designated as monomer type 3. The balance was acrylamide. Results are expressed as percent of polyacrylamide strength, calculated as follows:

% Polyacrylamide Strength =

$$\frac{\% \text{ Increase Sample}}{\% \text{ Increase Polyacrylamide}} \times 100$$

where % Increase Sample is the percent increase in tensile strength calculated as above for the grafted starch copolymers being tested, and % Increase Polyacrylamide is the percent increase in tensile strength calculated as above for the polyacrylamide.

TABLE 5

| Starch APOLLO Type | % | Monomer Type | % | % Solids | % Polyacrylamide Strength |
|---|---|---|---|---|---|
| 460 | 50 | 1 | 10 | 12.5 | 108 |
| 480 | 50 | 1 | 10 | 15 | 100 |
| 680 | 50 | 1 | 5 | 12 | 100 |
| 460/290 | 50 | 1 | 10 | 15 | 150 |
| 460 | 30 | 1 | 10 | 12.5 | 130 |
| 460 | 50 | 1 | 10 | 12.5 | 100 |
| 460/290 | 70 | 2 | 10 | 12 | 100 |
| 460/290 | 70 | 3 | 10 | 20 | 111 |
| 460/290 | 70 | 3 | 5 | 20 | 100 |
| 700 | 30 | 1 | 10 | 12 | 136 |

Since modifications of this invention will be apparent to those skilled in the art, it is intended that this invention be limited only by the scope of the appended claims.

What is claimed is:

1. Paper containing a cationic grafted starch copolymer comprising starch, nonionic vinyl monomer, and cationic vinyl monomer wherein:
   (a) said starch is present in amounts from about 10% to about 90% of the copolymer, and at least about 5% of the starch is cationic starch;
   (b) said nonionic vinyl monomer is present in amounts from about 90% to about 10% of the copolymer; and
   (c) said cationic vinyl monomer is present in amounts from about 5% to about 80% of the copolymer.

2. The paper of claim 1 wherein between about 2 pounds and about 25 pounds of the copolymer is added per ton of paper pulp.

3. The paper of claim 1 wherein from about pounds to about 15 pounds of copolymer per ton of paper pulp is added.

4. The paper of claim 1 wherein the starch used is essentially 100% cationic starch.

5. The paper of claim 4 wherein copolymer contains from about 20% to about 70% starch.

6. The paper of claim 1 wherein the cationic vinyl monomer is selected from the group consisting of the methyl chloride quaternary salt of dimethylaminoethyl methacrylate, the dimethyl sulfate quaternary salt of dimethylaminoethyl methacrylate, and the methyl chloride quaternary salt of methyl diallyl amine.

7. The paper of claim 1 wherein the cationic starch grafted copolymer is added to the paper pulp essentially in the form of crude reaction product.

8. Paper containing from about 2 pounds to about 25 pounds of a cationic grafted starch copolymer per ton of paper pulp, wherein said cationic grafted starch copolymer comprises:
   (a) from about 25% to about 55% cationic starch;
   (b) from about 35% to about 70% acrylamide; and
   (c) from about 5% to about 10% cationic vinyl monomer.

9. The paper of claim 8 wherein the cationic vinyl monomer is selected from the group consisting of the methyl chloride quaternary salt of dimethylaminoethyl methacrylate, the dimethyl sulfate quaternary salt of dimethylaminoethyl methacrylate, and the methyl chloride quaternary salt of methyl diallyl amine.

10. A method of preparing paper having improved dry tensile strength which comprises adding as a wet-end additive cationic grafted starch copolymer comprising starch, nonionic vinyl monomer, and a cationic vinyl monomer wherein:
    (a) said starch is present in amounts of from about 10% to about 90% of the copolymer, and at least about 5% of the starch is cationic starch;
    (b) said nonionic vinyl monomer is present in amounts of from about 90% to about 10% of the copolymer; and
    (c) said cationic vinyl monomer is present in amounts of from about 5% to about 80% of the copolymer.

11. The method of claim 10 wherein the cationic grafted, starch copolymer is added to the paper pulp essentially in the form of crude reaction product.

12. A method of preparing paper having improved dry tensile strength which comprises adding as a wet-end additive from about 2 pounds to about 25 pounds per ton of paper pulp of a cationic grafted starch copolymer comprising:
    (a) from about 25% to about 55% cationic starch;
    (b) from about 35% to about 70% acrylamide; and
    (c) from about 5% to about 10% cationic vinyl monomer.

13. The method of claim 12 wherein the cationic vinyl monomer is selected from the group consisting of the methyl chloride quaternary salt of dimethylaminoethyl methacrylate, the dimethyl sulfate quaternary salt of dimethylaminoethyl methacrylate, and the methyl chloride quaternary salt of methyl diallyl amine.

* * * * *